United States Patent
Gilbert et al.

(10) Patent No.: US 9,620,117 B1
(45) Date of Patent: Apr. 11, 2017

(54) LEARNING FROM INTERACTIONS FOR A SPOKEN DIALOG SYSTEM

(75) Inventors: Mazin Gilbert, Warren, NJ (US); Esther Levin, Livingston, NJ (US); Michael Lederman Littman, Bernardsville, NJ (US); Robert E. Schapire, Princeton, NJ (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 1888 days.

(21) Appl. No.: 11/426,748

(22) Filed: Jun. 27, 2006

(51) Int. Cl.
| | |
|---|---|
| G10L 15/00 | (2013.01) |
| G10L 15/14 | (2006.01) |
| G10L 15/28 | (2013.01) |
| G10L 21/00 | (2013.01) |
| G10L 25/00 | (2013.01) |
| G10L 15/26 | (2006.01) |
| G10L 15/06 | (2013.01) |

(52) U.S. Cl.
CPC ............ *G10L 15/26* (2013.01); *G10L 15/063* (2013.01)

(58) Field of Classification Search
CPC ................. G10L 15/1815; G06F 17/2785
See application file for complete search history.

(56) References Cited

U.S. PATENT DOCUMENTS

| | | | |
|---|---|---|---|
| 4,719,571 A * | 1/1988 | Rissanen et al. | |
| 6,208,971 B1 * | 3/2001 | Bellegarda et al. | 704/275 |
| 6,298,351 B1 * | 10/2001 | Castelli et al. | 707/102 |
| 6,941,266 B1 * | 9/2005 | Gorin et al. | 704/257 |
| 7,389,230 B1 * | 6/2008 | Nelken | 704/255 |
| 7,451,089 B1 * | 11/2008 | Gupta et al. | 704/270.1 |
| 7,729,918 B2 * | 6/2010 | Walker et al. | 704/275 |
| 7,734,471 B2 * | 6/2010 | Paek et al. | 704/270.1 |
| 8,370,127 B2 * | 2/2013 | Jan et al. | 704/9 |
| 2002/0035474 A1 * | 3/2002 | Alpdemir | 704/270 |
| 2003/0097249 A1 * | 5/2003 | Walker et al. | 704/1 |
| 2003/0154072 A1 * | 8/2003 | Young et al. | 704/9 |
| 2003/0187647 A1 * | 10/2003 | Conkie et al. | 704/258 |
| 2003/0191625 A1 * | 10/2003 | Gorin et al. | 704/1 |
| 2004/0006478 A1 * | 1/2004 | Alpdemir et al. | 704/275 |
| 2004/0205482 A1 * | 10/2004 | Basu et al. | 715/500.1 |
| 2006/0074670 A1 * | 4/2006 | Weng et al. | 704/257 |
| 2006/0080098 A1 * | 4/2006 | Campbell | 704/243 |
| 2006/0149555 A1 * | 7/2006 | Fabbrizio et al. | 704/275 |
| 2006/0293894 A1 * | 12/2006 | Peyroux | 704/257 |

OTHER PUBLICATIONS

Guillevic, D., Gandrabur, S., Normandin, Y., 2002. Robust semantic confidence scoring. In: Proc. Internat. Conf. on Spoken Language Processing-02, Denver, pp. 853-856.*

(Continued)

*Primary Examiner* — Michael Ortiz Sanchez

(57) ABSTRACT

In one embodiment, a semantic classifier input and a corresponding label attributed to the semantic classifier input may be obtained. A determination may be made whether the corresponding label is correct based on logged interaction data. An entry of an adaptation corpus may be generated based on a result of the determination. Operation of the semantic classifier may be adapted based on the adaptation corpus.

17 Claims, 4 Drawing Sheets

(56) References Cited

OTHER PUBLICATIONS

Rochery,M., Schapire,R., Rahim,M., Gupta,H., Riccardi,G., Bangalore,S., Alshawi.H, and Douglas,S. Combining prior knowledge and boosting for call classification in spoken language dialogue. In International Conference on Accoustics, Speech and Signal Processing, 2002.*

G. Di Fabbrizio, G. Tur, and D. Hakkani-Tr. Bootstrapping spoken dialog systems with data reuse. In Proceedings of 5th SigDial Workshop on Discourse and Dialogue, Boston, MA, May 2004.*

Tur, Gokhan / Rahim, Mazin / Hakkani-Tur, Dilek Z. (2003): "Active labeling for spoken language understanding", In EUROSPEECH-2003, 2789-2792.*

Daniel Gildea, Daniel Jurafsky. "Automatic Labeling of Semantic Roles". Computational Linguistics 2002 28:3, 245-288.*

M. Surdeanu and J. Turmo. 2005. Semantic role labeling using complete syntactic analysis. Procs of CoNLL-2005.*

Dia-Mole: An Unsupervised Learning Approach to Adaptive Dialogue Models for Spoken Dialogue Systems—Moeller—1997.*

Robert E. Shapire and Yoram Singer. Boostexter: A system for multiclass multilabel text categorization. Technical report, AT&T Labs—Research, 1998.*

Robert E. Schapire , Yoram Singer, BoosTexter: A Boosting-based System for Text Categorization, Machine Learning, v.39 n.23, p. 135-168, May-Jun. 2000.*

\* cited by examiner

LEARNING FROM INTERACTIONS FOR A SPOKEN DIALOG SYSTEM

BACKGROUND OF THE INVENTION

1. Field of the Invention

The present invention relates to spoken dialog systems, and in particular to methods, systems, and machine-readable media for unsupervised learning in spoken dialog systems based on interactions for the respective spoken dialog systems.

2. Introduction

Statistical modeling methods that rely on learning from data rather than hand-crafted rules have become the preferred approach for the development of sophisticated automated speech recognition systems. These methods led to now mature automated speech recognition (ASR) technology that is becoming widely used in everyday applications. In recent years, the use of this methodology was extended from acoustic and language models to other components of a spoken dialog system (SDS), including spoken language understanding, semantic classification, and dialog management. Some of the components, such as, for example, a semantic classifier for call routing applications, matured beyond research and are now successfully deployed in commercial applications.

However, three major gaps exist in the current spoken dialog systems:

1. Each data-driven component of a SDS is trained using independent sources of data to optimize component specific objective functions that are not directly related to performance of a system as a whole, resulting in suboptimal system performance. For example, an objective function for ASR is related to word or utterance error rate, and training data consists of labeled speech (usually application independent) to estimate the acoustic models, and text or transcribed speech (usually application dependent) for language model estimation. Semantic classifiers frequently used in call routing applications require corpora of transcribed utterances labeled by a call designation, and are trained to minimize error rate on a specific training corpus in use.
2. With the possible exception of use of reinforcement learning for dialog management, components of the SDS remain static after the system has been deployed, lacking the ability to adapt to a changing environment.
3. Although data-driven methodology has been shown to both lower design costs and lead to a superior performance for components, the drawback of the statistical approach, and a major inhibitor to progress, is the difficulty in obtaining suitable training data. The cost of data collection depends on a level of annotation required for training. A key research issue concerns finding robust ways to learn structure from un-annotated and partially annotated data. Usually only limited data collection and labeling prior to application deployment is feasible and commercially justifiable.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

In a first aspect of the invention, a method for unsupervised learning in a spoken dialog system is provided. A semantic classifier input and a corresponding label attributed to the semantic classifier input may be obtained. A determination may be made whether the corresponding label is correct based on logged interaction data. An entry of an adaptation corpus may be generated based on a result of the determination. Operation of the semantic classifier may be adapted based on the adaptation corpus.

In a second aspect of the invention, a spoken dialog system is provided. The spoken dialog system may include a semantic classifier, an adaptation corpus for unsupervised learning, and an automatic probabilistic annotator. The semantic classifier may be configured to receive input based on speech and to attribute a label to the input. The adaptation corpus may be used for adapting operation of the semantic classifier. The automatic probabilistic annotator may be configured to determine whether a label attributed to the input of the semantic classifier is a correct label based on logged interaction data. The automatic probabilistic annotator may be further configured to supplement the adaptation corpus based on a determination of whether the label attributed to the input of the semantic classifier is the correct label.

In a third aspect of the invention, a machine-readable medium having instructions recorded thereon for at least one processor may be provided. The machine-readable medium may include instructions for obtaining a semantic classifier input and a corresponding label attributed to the input by a semantic classifier of a spoken dialog system, instructions for determining whether the corresponding label is correct based on logged interaction data, instructions for generating an entry for an adaptation corpus based on a result of the determining, and instructions for adapting operation of the semantic classifier based on the adaptation corpus.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Spoken Dialog Systems

Figure 1:
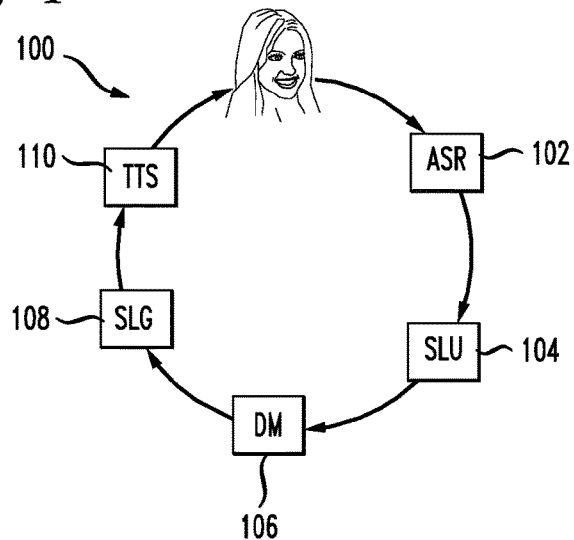
FIG. 1 illustrates an exemplary spoken dialog system consistent with principles of the invention.

FIG. 1 is a functional block diagram of an exemplary natural language spoken dialog system 100 consistent with the principles of the invention. Natural language spoken dialog system 100 may include an automatic speech recognition (ASR) module 102, a spoken language understanding (SLU) module 104, a dialog management (DM) module 106, a spoken language generation (SLG) module 108, and a text-to-speech (TTS) module 110.

ASR module 102 may analyze speech input and may provide a transcription of the speech input as output. SLU module 104 may receive the transcribed input and may use a natural language understanding model to analyze the group of words that are included in the transcribed input to derive a meaning from the input. DM module 106 may receive the meaning or intent of the speech input from SLU module 104 and may determine an action, such as, for example, providing a spoken response, based on the input. SLG module 108 may generate a transcription of one or more words in response to the action provided by DM module 106. TTS module 110 may receive the transcription as input and may provide generated audible speech as output based on the transcribed speech.

Thus, the modules of system 100 may recognize speech input, such as speech utterances, may transcribe the speech input, may identify (or understand) the meaning of the transcribed speech, may determine an appropriate response to the speech input, may generate text of the appropriate response and from that text, generate audible "speech" from system 100, which the user then hears. In this manner, the user can carry on a natural language dialog with system 100. Those of ordinary skill in the art will understand the programming languages and means for generating and training ASR module 102 or any of the other modules in the spoken dialog system. Further, the modules of system 100 may operate independent of a full dialog system. For example, a computing device such as a smartphone (or any processing device having a phone capability) may have an ASR module wherein a user may say "call mom" and the smartphone may act on the instruction without a "spoken dialog."

FIG. 1 is an exemplary spoken dialog system. Other spoken dialog systems may include other types of modules and may have different quantities of various modules.

Figure 2:
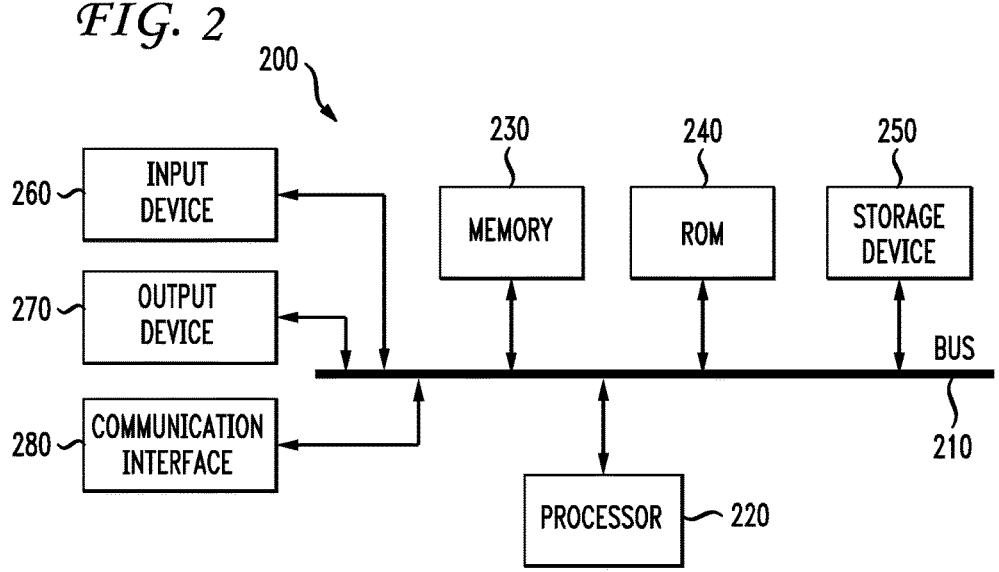
FIG. 2 illustrates an exemplary processing system which may be used to implement components of the spoken dialog system of FIG. 1.

FIG. 2 illustrates an exemplary processing system 200 in which one or more of the modules of system 100 may be implemented. Thus, system 100 may include at least one processing system, such as, for example, exemplary processing system 200. System 200 may include a bus 210, a processor 220, a memory 230, a read only memory (ROM) 240, a storage device 250, an input device 260, an output device 270, and a communication interface 280. Bus 210 may permit communication among the components of system 200.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media, such as, for example, magnetic or optical recording media and its corresponding drive.

Input device 260 may include one or more conventional mechanisms that permit a user to input information to system 200, such as a keyboard, a mouse, a pen, a voice recognition device, etc. Output device 270 may include one or more conventional mechanisms that output information to the user, including a display, a printer, one or more speakers, or a medium, such as a memory, or a magnetic or optical disk and a corresponding disk drive. Communication interface 280 may include any transceiver-like mechanism that enables system 200 to communicate via a network. For example, communication interface 180 may include a modem, or an Ethernet interface for communicating via a local area network (LAN). Alternatively, communication interface 180 may include other mechanisms for communicating with other devices and/or systems via wired, wireless or optical connections.

System 200 may perform functions in response to processor 220 executing sequences of instructions contained in a computer-readable medium, such as, for example, memory 230, a magnetic disk, or an optical disk. Such instructions may be read into memory 230 from another computer-readable medium, such as storage device 250, or from a separate device via communication interface 280.

Conclusion

The above-described embodiments are exemplary and are not limiting with respect to the scope of the invention. Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Further, in other implementations, hardwired logic may be used instead of processors, or one or more application specific integrated circuits (ASICs) may be used in implementations consistent with the principles of the invention. In addition, implementations consistent with the principles of the invention may have more or fewer acts than as described, or may implement acts in a different order than as shown. Accordingly, the appended claims and their legal equivalents should only define the invention, rather than any specific examples given.

Overview

Implementations consistent with the principles of the invention take advantage of a data source that is free once the system is deployed, namely, one or more interaction logs. Although the one or more interaction logs do not require additional transcription and labeling to be used for learning, and are therefore a form of unsupervised learning, the one or more interaction logs may include feedback from the user that may be exploited to evaluate and improve system performance. Intuitively, one would expect 'unsuccessful' dialogs that correspond to transactions that were not automated due to user's hang-ups, or other problems, to be correlated with one or more components of the system not performing well, and provide 'negative examples' for components adaptation. Transactions that were fully automated should correlate with good performance of the components, and therefore provide positive training examples. Another example of a user's feedback that intuitively is related to performance of components is negative or positive confirmation. One would expect negative confirmation to correlate with bad performance and provide negative training examples, while positive confirmation will provide positive training examples. Although the confirmations themselves may be captured through a noisy ASR channel, usually the error rate for confirmation is significantly lower than for other types of processing. Therefore, confirmations may provide a low-noise feedback on components with a higher error rate.

Implementations consistent with the principles of the invention may automatically create an adaptation corpus of noisy or probabilistically labeled examples for the components by extracting, from each of the one or more interaction logs, input and output of each component involved in the session, corresponding to an input-output example. Some of these examples may be positive, i.e., the output value is the correct value for the given input, and some may be negative, where the output is wrong. Implementations may utilize dialog features, such as session outcome (e.g., user hang-up before the end of the session, full automation, transition of the call to an operator), negative and positive confirmations, total dialog duration, etc., to predict which example is positive and which is negative, and may use knowledge of these dialog features in retraining the components of the system.

Automatic Probabilistic Annotator

Figure 3:
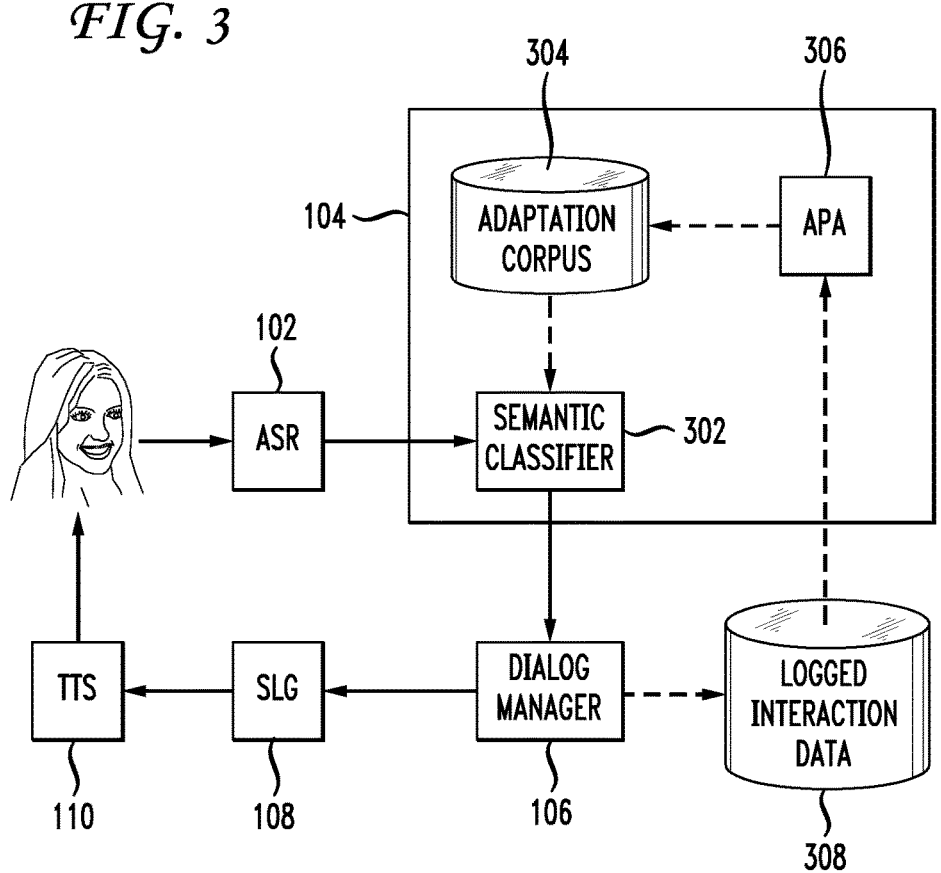
FIG. 3 illustrates a more detailed view of the exemplary spoken dialog system of FIG. 1.

FIG. 3 illustrates a more detailed view of exemplary system 100. SLU module 104 may include a semantic classifier 302, an automatic probabilistic annotator (APA) 306 and an adaptation corpus 304. DM 106, as well as other modules or components, may log interactions to one or more interaction logs 308.

A user may verbally provide a request, such as, "I would like to get my balance." The request may be received by ASR module 102, which may transcribe the spoken request into textual form and may then provide the text to SLU module 104. Semantic classifier 302 may analyze the received transcribed verbal request and may classify the request as one of a group of possible requests or call-types and further may produce a corresponding semantic label, such as, "Request (Balance)". Semantic Classifier 302 may then provide the transcription and the corresponding semantic label to DM module 106, which may record the transcription and semantic label to one or more logged interaction database 308. Alternatively, semantic classifier 302 may record the transcription and semantic label to one or more interaction logs 308.

DM module 106 may perform actions based on the semantic label. For example, DM module 106 may retrieve requested information for a user and may provide the information to SLG module 108, which may then provide appropriate input, such as textual input, to TTS 110 for speech generation to generate audible speech for a response to the user. DM module 106 may record requests that originated from the user and were provided to DM module 106 via semantic classifier 302 and may record any responses or actions generated by DM module 106 to one or more logged interaction database 308. DM module 106 may also be informed of various events, such as, for example, a user hang-up and may record the hang-up event to one or more interaction logs 308.

APA 306 may be initially trained using a variety of data recorded in one or more interaction logs 308 and manual annotations. During operation, APA 306 may have access to all data recorded in one or more interaction logs 308, including, for example, a label that semantic classifier 302 attributed to input provided to semantic classifier 302, as well as actions recorded by DM module 106 or other modules, such as, for example, a hang-up or other actions and may make a determination with respect to the correctness of a label assigned by semantic classifier 302 based on the recorded data in one or more interaction logs 308. Based on this determination, APA 306 may create an entry in adaptation corpus 304, which may be used to adapt components, such as, for example, semantic classifier 302, to improve performance.

Because APA 306 may perform a function similar to that of semantic classifier 302, APA 306 may be implemented such that it uses a same type of learning process as semantic classifier 302. In one implementation, APA 306 may be implemented using the well-known Boostexter learning process, which combines many simple and moderately accurate categorization rules that are trained sequentially into a single, highly accurate model that can reliably predict a class.

In a simple version of Boostexter for single-label classification, a boosting algorithm may maintain a set of weights over training examples. These weights may be used by a weak learning algorithm whose purpose is to find a weak hypothesis with moderately low error with respect to the weights. Thus, the boosting algorithm may use the weights to force the weak learner to concentrate on the examples which are hardest to classify. For multi-class, multi-label problems, a set of weights may be maintained over training examples and labels. As boosting progresses, training examples and their corresponding labels that are hard to predict correctly may get incrementally higher weights while examples and labels that are easy to classify may get lower weights. The intended effect is to force the weak learning algorithm to concentrate on examples and labels that will be most beneficial to the overall goal of finding a highly accurate classification rule.

Binary APA

In one implementation consistent with the principles of the invention, APA 306 may be a binary APA. In such an implementation, for each example of an input-output pair, (x, y), for semantic classifier 302, extracted from one or more interaction logs 308, where input x may be a speech recognition result in a form of a string, N-best hypotheses, or a lattice, and where y may be a label of the semantic class that the classifier attributed to x, and given other automatically extracted dialog level features, such as, for example, an outcome of a call, positive and/or negative confirmations, re-prompts and their results, confidence scores, etc., a determination may be made with respect to whether y is a correct label for x. In some implementations, a soft-decision version of the APA may be employed, where the APA may estimate a probability that y is the correct label for x. In such implementations, if the estimate of the probability is greater than a predetermined threshold value, the APA may indicate that semantic classifier 302 made the correct decision. The predetermined threshold value may be 60%, 50%, or some other suitable threshold value.

Figure 4:
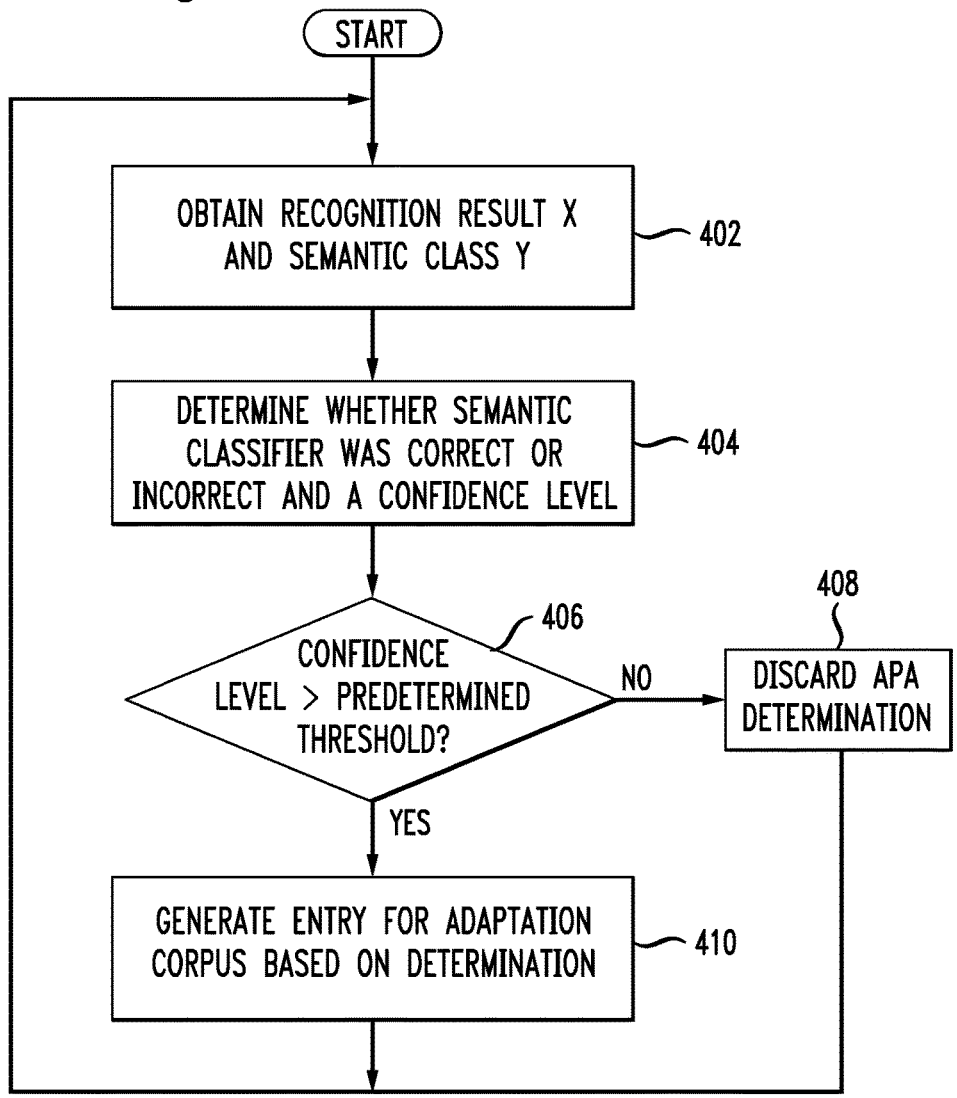
FIGS. 4 and 5 are flowcharts that illustrate exemplary processing in implementations consistent with the principles of the invention.

FIG. 4 is a flowchart that illustrates exemplary processing that may be performed in an implementation of a SDS in which APA 306 is a binary APA. The process may begin with APA 306 obtaining a semantic classifier input, x, from one or more interaction logs 308 (act 402). X may be a recognition result from ASR 102. With reference to data included in one or more interaction logs 308, APA 306 may determine whether a label, y, attributed to the ASR result by semantic classifier 302 is or is not a correct label and a confidence level of the determination (act 404). The confidence level may be indicative of a probability that the determination of APA 306 is correct. To make the determination, APA 306 may utilize user's feedback and other dialog features derived from one or more interaction logs 308. Next, APA 306 may determine whether the confidence level of the determined classification is greater than a predetermined threshold (act 406). If the confidence level is not greater than the predetermined threshold, then APA 306 may discard the APA determination (act 408). Otherwise, APA 306 may generate an entry for adaptation corpus 304 based on the determination (act 410). For example, the entry may include probabilistically labeled examples for one or more dialog system components. As an example, suppose that the APA 306 determines that the determined classification, for example, a billing request, has a confidence level of 0.7 or 70%, then a labeled example for an entry to adaptation corpus 304 may include semantic classifier input x, a label y from the semantic classifier, and the confidence level 0.7 from APA 306.

Retraining of dialog system components, such as, for example, semantic classifier 302, may be performed based on adaptation corpus 304 to thereby improve performance of the dialog system components, such as, semantic classifier 302.

Multi-Class APA

In other implementations of a spoken dialog system consistent with the principles of the invention, APA 306 may be a multi-class APA. The multi-class APA may employ a well-known multi-class, multi-label version of Boostexter or other learning method. In one implementation, APA 306 may determine whether a label attributed to recognized speech input by semantic classifier 302 is correct. If APA 306 determines that the label is correct and a corresponding confidence level of the determination by APA 306 is greater than a predetermined threshold, then the APA may generate an entry to adaptation corpus 304. The entry may include the input to semantic classifier 302, the determination and the confidence level. The predetermined threshold may be 50%, 60%, or another suitable value.

If APA 306 determines that the label provided by semantic classifier 302 is not correct, then APA 306 may provide a label that APA 306 determined to be correct along with a corresponding confidence level. APA 306 may then generate an entry for adaptation corpus 306. The entry may include the input to semantic classifier 302, the correct label and a confidence level indicative of an estimated probability of the determination by APA 306.

Figure 5:
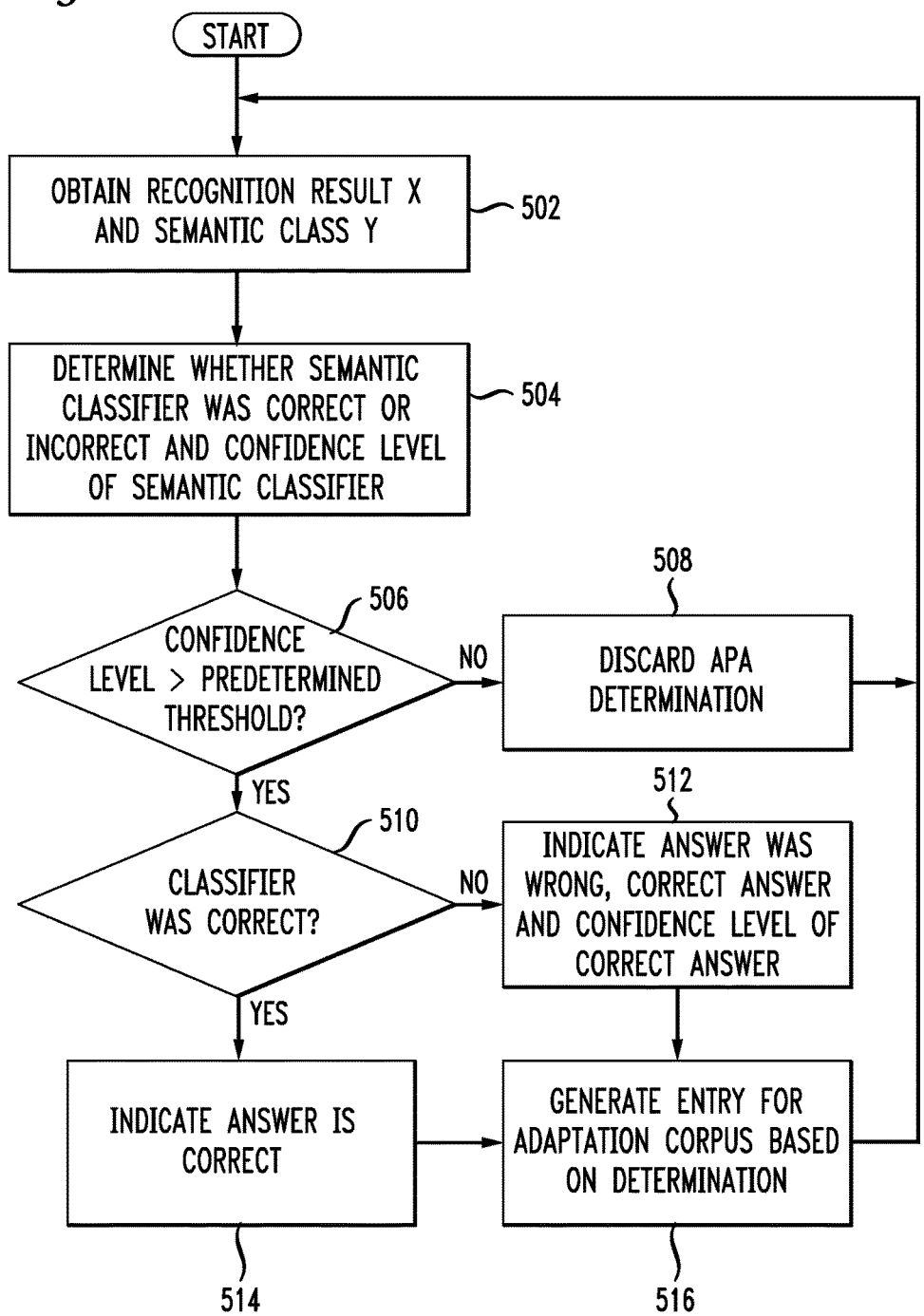

FIG. 5 is a flowchart that illustrates an exemplary process that may be performed in implementations in which APA 306 is a multi-class APA. The process may begin with APA 306 accessing one or more interaction logs 308 to obtain a recognition result, x, which was provided as input to semantic classifier 302, and a label, y, attributed by semantic classifier 302 to the recognition result (act 502). With reference to the information included in one or more interaction logs 308, which may include information indicating actions such as, for example, a user hang-up or other actions, APA 306 may make a determination with respect to the correctness of the label, y, assigned by semantic classifier 302 and a confidence level indicative of a probability that the determination by APA 306 is correct (act 504).

If the confidence level of APA 306 is not greater than a predetermined threshold, then APA 306 may discard the determination (act 508). Otherwise, if APA 306 determined that the semantic classifier was correct (act 510), APA 306 may indicate that semantic classifier 302 was correct (act 514) and may generate an entry of adaptation corpus 304 (act 516). The entry may include the input, x, to semantic classifier 302 and the label, y, attributed to the input by semantic classifier 302.

If, at act 510, APA 306 determined that the label, y, provided by semantic classifier 302 was not correct, then APA 306 may indicate that semantic classifier 302 was incorrect, may provide a correct answer and may provide a confidence level indicative of a probability that the correct answer provided by APA 306 is correct (act 512). The APA may then generate an entry for adaptation corpus 304 that may include the input, x, provided to semantic classifier 302, the correct answer provided by APA 306 and the confidence level (act 516). Adaptation corpus 304 may be used to retrain components of a SDS, such as, for example, semantic classifier 302.

Adaptation and Retraining of Semantic Classifier

Semantic classifiers are usually trained using a training corpus of hand-labeled examples to minimize a criterion related to classification errors on these examples. As discussed above, after such a semantic classifier has been deployed within a SDS and interaction logs created, an APA may process the logs and output an additional adaptation corpus of probabilistically labeled examples. Automatically obtained labels in this corpus may be noisy because the performance of the APA is not perfect. The adaptation corpus that is produced by the APA may be regarded as a set of noisy examples, where the noise for each example is quantitatively related to a probability that is associated by the APA for this example. The probabilities may be used in a number of different ways for controlling the performance of adaptation of the semantic classifier. Two exemplary methods include:

First, examples for which the APA's certainty or confidence level (as measured by the probability attached to each example) are not greater than a predetermined threshold may be discarded, and the remaining examples may be used as if they are noise-free.

Second, use boosting algorithms that, for each round of learning, take a weight attributed to each labeled example as an input and form a distribution over such examples. Usually, in a first round of learning one weight applies to all the examples. However, the probabilities attributed by the APA may be used to produce initial weights for the examples in the adaptation corpus, giving more weight to examples that have more certainty in being correct.

CONCLUSION

The above-described embodiments are exemplary and are not limiting with respect to the scope of the invention. Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Further, in other implementations, hardwired logic may be used instead of processors, or one or more application specific integrated circuits (ASICs) may be used in implementations consistent with the principles of the invention. In addition, implementations consistent with the principles of the invention may have more or fewer acts than as described, or may implement acts in a different order than as shown. Accordingly, the appended claims and their legal equivalents should only define the invention, rather than any specific examples given.

We claim:

1. A method comprising:
   obtaining, during an unsupervised classification phase of a spoken dialog system, a semantic classifier input and a corresponding label attributed to the semantic classifier input;
   determining, via a processor, whether the corresponding label is correct based on logged interaction data, to yield a correctness result, wherein the logged interaction data comprises:
   data describing user speech;
   a non-speech user action indicating one of a negative training example and a positive training example; and
   an input/output pair having an input and an output, the input comprising a speech recognition result in a lattice form and the output comprising one of an outcome of a call, a confirmation by a user, and a call hang-up, the output being a result of the input;
   generating an entry for an adaptation corpus based on the correctness result; and
   adapting operation of a semantic classifier based on the adaptation corpus.

2. The method of claim 1, wherein determining whether the corresponding label is correct indicates whether the label attributed by the semantic classifier is one of a correct label and an incorrect label.

3. The method of claim 1, wherein determining whether the corresponding label is correct further comprises:

calculating a confidence level indicative of an estimated probability that the label attributed by the semantic classifier is correct; and determining that the label attributed by the semantic classifier is correct when the calculated confidence level is greater than a predetermined threshold.

4. The method of claim 1, wherein when the corresponding label is not correct, the method further comprises:

determining a correct label based on logged interaction data;

calculating a confidence level indicative of an estimated probability that the correct label is correct; and recording the semantic classifier input, the correct label and the confidence level in a respective entry of the adaptation corpus.

5. The method of claim 1, wherein adapting operation of the semantic classifier based on the adaptation corpus further comprises:

using a boosting method to adapt the semantic classifier.

6. A system comprising:

a processor; and a computer-readable storage medium having instructions stored which, when executed by the processor, cause the processor to perform operations comprising:

obtaining, during an unsupervised classification phase of a spoken dialog system, a semantic classifier input and a corresponding label attributed to the semantic classifier input;

determining, via a processor, whether the corresponding label is correct based on logged interaction data, to yield a correctness result, wherein the logged interaction data comprises:

data describing user speech;

a non-speech user action indicating one of a negative training example and a positive training example; and an input/output pair having an input and an output, the input comprising a speech recognition result in a lattice form and the output comprising one of an outcome of a call, a confirmation by a user, and a call hang-up, the output being a result of the input;

generating an entry for an adaptation corpus based on the correctness result; and adapting operation of a semantic classifier based on the adaptation corpus.

7. The system of claim 6, further comprising:

a dialog manager associated with the spoken dialog system configured to control the processor to receive the corresponding label and to determine one of a plurality of actions to perform based on the corresponding label.

8. The system of claim 7, wherein:

the dialog manager is further configured to control the processor to record interactions to the logged interaction data.

9. The spoken dialog system of claim 6, wherein determining whether the corresponding label is correct further comprises:

calculating a confidence level indicative of an estimated probability that the corresponding label is correct; and determining that the corresponding label is correct when the calculated confidence level is greater than a predetermined threshold.

10. The system of claim 6, the computer-readable storage medium having additional instruction stored which result in the operations further comprising:

when the corresponding label is not correct:

determining a correct label based on the logged interaction data; and calculating a confidence level indicative of an estimated probability that the correct label is correct; and recording the semantic classifier input, the correct label and the confidence level in a respective entry of the adaptation corpus.

11. The system of claim 6, wherein the semantic classifier is arranged to adapt its operation based on the adaptation corpus by using a boosting method.

12. A computer-readable storage device having instructions stored which, when executed by a computing device, cause the processor to perform operations comprising:

obtaining, during an unsupervised classification phase of a spoken dialog system, a semantic classifier input and a corresponding label attributed to the input by a semantic classifier;

determining whether the corresponding label is correct based on logged interaction data, to yield a correctness result, wherein the logged interaction data comprises:

data describing user speech;

a non-speech user action indicating one of a negative training example and a positive training example; and an input/output pair having an input and an output, the input comprising a speech recognition result in a lattice form and the output comprising one of an outcome of a call, a confirmation by a user, and a call hang-up, the output being a result of the input;

generating an entry for an adaptation corpus based on the correctness result result; and adapting operation of a semantic classifier based on the adaptation corpus.

13. The computer-readable storage device of claim 12, the computer-readable storage device having additional instructions stored which result in the operations further comprising recording interactions of a component of the spoken dialog system to the logged interaction data.

14. The computer-readable storage device of claim 12, wherein determining whether the corresponding label is correct based on logged interaction data further comprises:

calculating a confidence level indicative of an estimated probability that the corresponding label attributed by the semantic classifier is correct; and determining that the corresponding label attributed by the semantic classifier is correct when the calculated confidence level is greater than a predetermined threshold.

15. The computer-readable storage device of claim 12, wherein determining whether the corresponding label is correct based on logged interaction data, further comprises:

determining when the corresponding label is not correct;

determining a correct label based on the logged interaction data;

calculating a confidence level indicative of an estimated probability that the determined correct label is correct; and recording the semantic classifier input, the correct label and the confidence level in a respective entry of the adaptation corpus.

16. The computer-readable storage device of claim 12, wherein determining whether the corresponding label is correct based on logged interaction data further comprises:

recording a confidence level to the adaptation corpus only when the corresponding label is determined to be incorrect.

17. The computer-readable storage device of claim 12, wherein adapting operation of the semantic classifier based on the adaptation corpus further comprises:
    using a boosting method to adapt the semantic classifier.

* * * * *